(12) United States Patent
Nguyen et al.

(10) Patent No.: US 7,996,698 B2
(45) Date of Patent: Aug. 9, 2011

(54) SYSTEM AND METHOD FOR ENABLING FUNCTIONALITY BASED ON MEASURED POWER

(75) Inventors: Thien T. Nguyen, Fremont, CA (US); Giridhara Gopalan, Los Gatos, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 687 days.

(21) Appl. No.: 11/784,279

(22) Filed: Apr. 5, 2007

(65) Prior Publication Data

US 2008/0250261 A1 Oct. 9, 2008

(51) Int. Cl.
*G06F 1/26* (2006.01)
(52) U.S. Cl. ........................... 713/340; 713/300
(58) Field of Classification Search .................. 713/300, 713/320, 323, 324, 340
See application file for complete search history.

(56) References Cited

U.S. PATENT DOCUMENTS

| | | | | |
|---|---|---|---|---|
| 5,065,360 A | * | 11/1991 | Kelly | 708/142 |
| 6,031,999 A | * | 2/2000 | Ogawa | 396/303 |
| 6,594,771 B1 | * | 7/2003 | Koerber et al. | 713/330 |
| 6,828,760 B2 | * | 12/2004 | Massey et al. | 320/127 |
| 2004/0230846 A1 | * | 11/2004 | Mancey et al. | 713/300 |
| 2006/0164108 A1 | * | 7/2006 | Herbold | 324/691 |
| 2008/0043675 A1 | * | 2/2008 | Mousseau et al. | 370/331 |
| 2008/0244279 A1 | * | 10/2008 | Godzinski et al. | 713/300 |

OTHER PUBLICATIONS

IEEE St. 802.3af-2003, Telecommunications and information exchange between systems—Local and metropolitan area networks—specific requirements, Part 3: Carrier Sense Multiple Access with Collision Detection (CSMA/CD) Access Method and Physical Layer Specifications; Amendment: Data Terminal Equipment (DTE) Power via Media Dependent Interface (MDI), Jun. 12, 2003, pp. Title-121, IEEE, New York, NY, Print ISBN 0-7381-3896-4 SH95132; PDF ISBN 0-7381-3697-2 SS95132.

\* cited by examiner

*Primary Examiner* — Thomas Lee
*Assistant Examiner* — Paul B Yanchus, III
(74) *Attorney, Agent, or Firm* — Blakely, Sokoloff, Taylor & Zafman LLP

(57) ABSTRACT

According to one embodiment of the invention, an apparatus comprises an input port, a measuring circuit and a processor. The measuring circuit is adapted to measure a power parameter associated with power supplied over a communication media to the input port. The processor includes a plurality of logic units. Each logic unit is configured to be activated in series to control power usage of the apparatus.

20 Claims, 6 Drawing Sheets

SYSTEM AND METHOD FOR ENABLING FUNCTIONALITY BASED ON MEASURED POWER

FIELD

Embodiments of the invention relate to the field of networked power supply architectures, and in particular, to a system and method for selectively enabling logic units to increase functionality of a powered device based on a voltage measured at an input port of the powered device.

GENERAL BACKGROUND

Over the last decade or so, the popularity of Ethernet-based local area networks (LANs) has increased tremendously. In the 1980s, the Institute of Electrical and Electronic Engineers (IEEE) developed an Ethernet standard designated as IEEE 802.3, which was universally adopted by the network industry. However, this standardized Ethernet communication scheme suffered from physical location restrictions since communication devices operating in accordance with IEEE 802.3 needed to be in close proximity to an Alternating Current (AC) power outlet.

Recently, a revised standard entitled "Data Terminal Equipment (DTE) Power Via Media Dependent Interface" (IEEE 802.3af, 2001), was adopted. In accordance with the revised standard, power may be supplied over Ethernet cabling from power supply equipment (referred to as a "PSE") to an IEEE 802.3af compliant powered device (referred to as a "PD") when Power-over-Ethernet (PoE) circuitry is deployed within the PSE.

More specifically, in accordance with IEEE 802.3af, forty-eight (48) volts DC is supplied over two out of four available pairs on a CAT-3 or CAT-5 cable with a maximum current of about 350 milliamperes (mA) for a maximum load power of 15.4 watts (W). In some configurations, only a minimum of 12.95 W is available after considering voltage losses over the communication media.

One problem that still remains with the IEEE 802.3af standard is the lack of any mechanism to detect insufficient power supply levels, and upon detection, to automatically alter the functionality of the powered device. The existence of this problem is based on the fact that, in some cases, powered devices (PDs) operate in a mixed environment, where PDs may be powered by PSEs with different electrical characteristics and may further experience different levels of power loss based on the type and length of Ethernet cabling used. Hence, depending on the particular power characteristics of the PSE and the type/length of cabling, a powered device may be powered up and become fully operational in some environments or may be unable to be powered up in other environments.

BRIEF DESCRIPTION OF THE DRAWINGS

The invention may best be understood by referring to the following description and accompanying drawings that are used to illustrate embodiments of the invention.

DETAILED DESCRIPTION

Figure 1A:
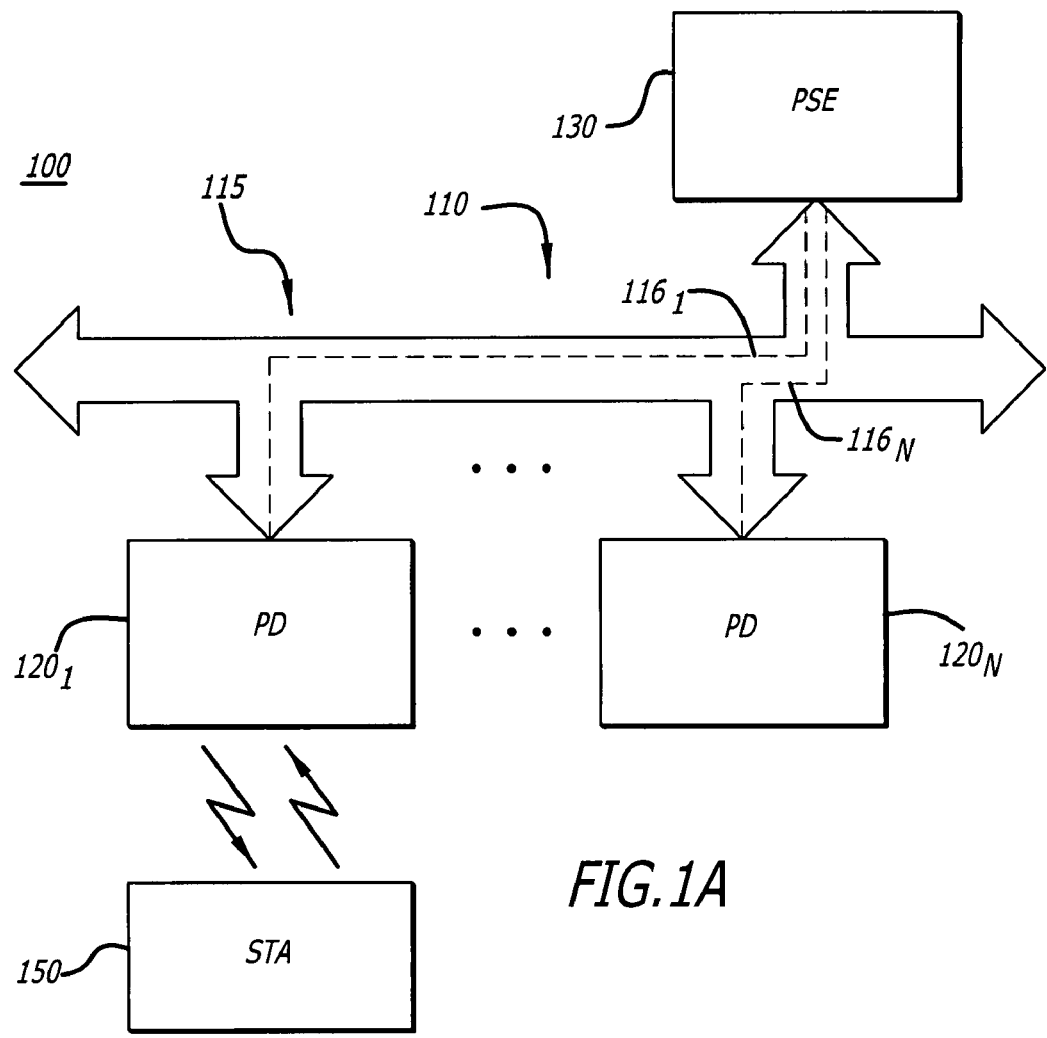
FIG. 1A is an exemplary embodiment of a network including power supply equipment (PSE) and at least one powered device (PD).

Embodiments of the invention relate to a system and method for selectively activating logic units within a powered device based on the amount of voltage measured at an input port such an Ethernet port coupled to wired communication media. This selective activation scheme is conducted to account for different electrical characteristics among different power source equipment (PSE) and different power loss levels due to different types and lengths of communication media used in supplying power from the PSE to the powered device (PD).

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the invention. For example, the terms "logic" and "logic unit" are defined as hardware circuitry and/or software. Firmware may be considered to be a combination of software and hardware. The "software" may be executable code such as an application, an applet, a routine or even one or more executable instructions stored in a storage medium. The "storage medium" may include, but is not limited or restricted to a programmable electronic circuit, a semiconductor memory device inclusive of volatile memory (e.g., random access memory, etc.) and non-volatile memory (e.g., programmable and non-programmable read-only memory, flash memory, etc.), a hard drive, a portable memory device (e.g., floppy diskette, a compact disk "CD", digital versatile disc "DVD", a digital tape, a Universal Serial Bus "USB" flash drive), or any medium that is deemed statutory by a court of law.

A "powered device" is an electronic device that is adapted to receive power from another device over a communication media. Examples of a powered device (PD) include, but are not limited or restricted to a laptop computer, a networked Voice-over-IP (VoIP) desktop phone, an access point, a security camera, a printer, or any other device adapted to receive power from a remotely located source. Herein, the powered device may be compliant with IEEE 802.3af or any subsequent standards supporting the delivery of power over a communication media such as IEEE 802.3at for example.

"Power source equipment" (PSE) is an electronic device, such as a network switch (e.g., Ethernet switch) for example, that is adapted to provide power to the powered device over a communication media. "Communication media" is a wired or wireless interconnect that carries both power and data. For instance, according to one embodiment of the invention, the interconnect is an Ethernet cable having twisted wire pairs. Examples of different types of Ethernet cable include, but are not limited or restricted to certain Category (CAT) cabling such as CAT-3 or CAT-5 cables for example.

A "power event" is a condition where the PD alters its state by increasing power usage from an inactive state (e.g., PD is powered-off or is in an operating mode with minimal power consumption) in response to an event such as Power-on, Reset, activity that causes the PD to exit from a Sleep or Hibernate state, or the like.

Referring to FIG. 1A, an exemplary embodiment of a network 100 including power supply equipment (PSE) and at least one powered device (PD) is shown. In accordance with one embodiment of the invention, network 100 may be implemented as a wireless local area network (WLAN) including a wired network 110 operating as an Open Source Interconnect (OSI) Layer 2/Layer 3 (L2/L3) network. Wired network 110 further comprises a wired communication media 115 that enables power to be supplied from power source equipment 130 (PSE) to one or more of powered devices (PD) $120_1$-$120_N$ (N≧1) through dedicated media links $116_1$-$116_N$.

According to one embodiment of the invention, PSE 130 is represented by a network switch (e.g., Ethernet switch) and at least one PD (e.g., PD $120_1$) is represented as an access point (AP). According to another embodiment of the invention, PSE 130 is represented by a combination of a network switch and intermediary device, such as a midspan PoE injector for example, to assist in providing power to PD $120_1$. The use of this intermediary device is used when the network switch does not have sufficient external power supply capabilities.

Figure 1B:
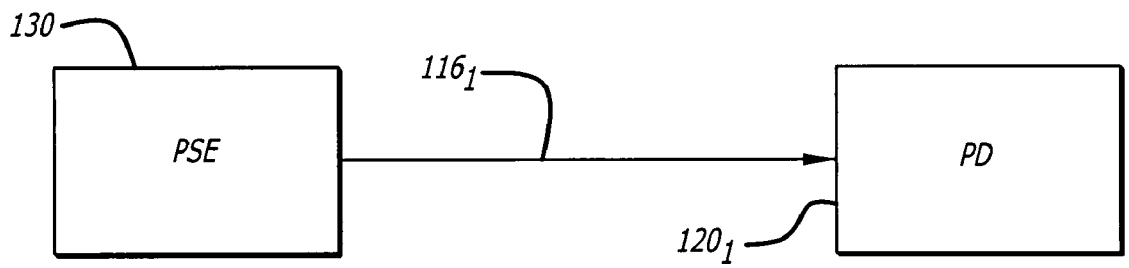
FIG. 1B is a general illustration of the PSE in communication with the PD over a wired communication media.

As shown in FIG. 1A, according to this embodiment of the invention, PD $120_1$ is adapted to provide wireless communications with one or more wireless stations 150 and includes a voltage measuring circuit (not shown) to monitor supply voltage levels supplied by PSE 130 for use in activating different logic units deployed within PD $120_1$. While the illustrative embodiments describe the supply of power between an Ethernet switch and AP $120_1$, it is contemplated that the claimed invention generally involves communications between at least two electronic devices with a first electronic device (PSE) supplying power to a second electronic device (PD) that activates logic units within the electronic device to alter functionality based on the measured supply power as shown in FIG. 1B.

Figure 2:
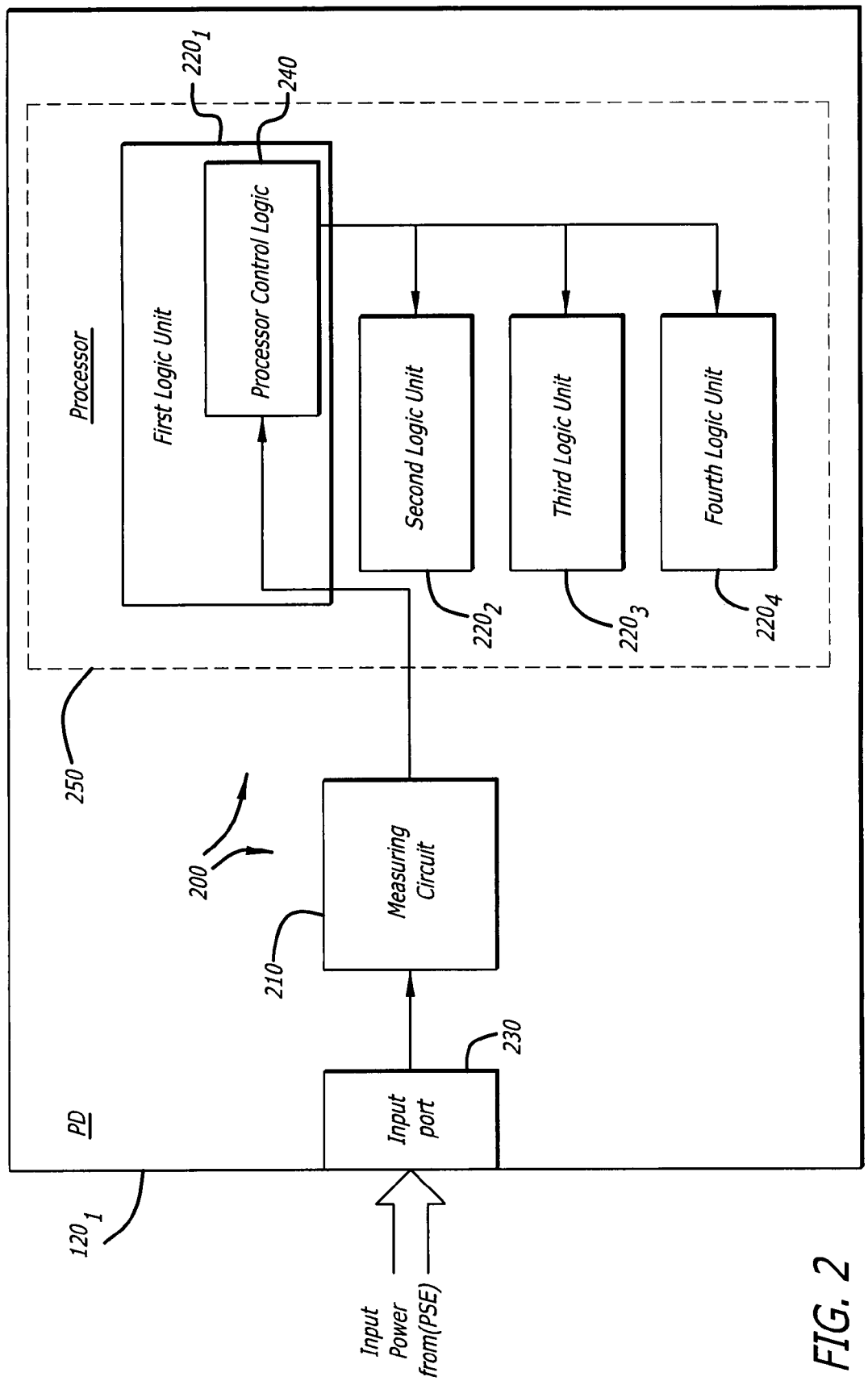
FIG. 2 is a general exemplary embodiment of a voltage control circuit for controlling operations of functional logic implemented within the powered device.

Referring to FIG. 2, a general exemplary embodiment of activation logic 200 implemented within PD 120, for controlling the activation and/or deactivation of logic units implemented therein. Activation logic 200 comprises one or more voltage measuring circuits 210 and a plurality of logic units $220_1$-$220_M$ (M≧2), where each logic unit $220_1$-$220_M$ is electrically powered and responsible for performing various functions.

According to one embodiment of the invention, a measuring circuit 210 is positioned to measure the amount of voltage detected at an input port 230. This measured voltage is associated with the power supplied by PSE 130 to PD $120_1$. The measured voltage is read by control logic 240 that are responsible for controlling the activation of logic unit(s) $220_1$, . . . , and/or $220_M$. The "reading" of such voltage may be accomplished by representative signals to denote the actual voltage measured, voltage ranges, or even whether voltage thresholds have or have not been exceeded. As shown, processor control logic 240 is implemented within first logic unit $220_1$, although it is contemplated that control logic 240 may be separate from first logic unit $220_1$.

Alternatively, although not shown, voltage measuring circuits 210 could be implemented within each logic unit $220_1$, . . . , and/or $220_M$, provided the voltage measuring circuits 210 required and received minimal power substantially less than the amount of power required to activate the corresponding logic unit. As a result, control logic 240 would be adapted to read the measured voltage from each of the voltage measuring circuits before activation of the logic unit associated with that voltage measuring circuit or the subsequent logic unit if activation is determined serially.

According to one embodiment of the invention, logic units $220_1$-$220_M$ may be fully (as shown) or partially implemented within a processor 250. Examples of various types of processors include, but are not limited or restricted to a microprocessor, an application specific integrated circuit, a programmable gate array, a digital signal processor, a microcontroller, a state machine, or the like.

For instance, according to this embodiment of the invention, a first logic unit $220_1$ is configured to perform initial set-up functions such as a boot operation. More specifically, after PD 120, is powered on, processor control logic 240 begins fetching instructions in order to initialize memory that stores the boot code. After initialization of the memory, processor control logic 240 executes the boot code that enables it to read status information from measuring circuit 210 to determine if there is enough available input power to activate and enable the functionality associated with a second logic unit $220_2$.

In summary, first logic unit $220_1$ is always powered and active, and thus, controls the activation of any subsequent logic units that provide expanded functionality to PD $120_1$ (e.g., second logic unit $220_2$). Hence, the activation of logic unit $220_2$ . . . or $220_M$ is conditioned on whether there is sufficient power provided by PSE 130 to support their activation.

As an illustrative example, second logic unit $220_2$ could be circuitry controlling a first RF circuit to receive and transmit signals over a first frequency range while third logic unit $220_3$ could be circuitry controlling a second RF circuit to receive and transmit signals over a second frequency range differing from the first frequency range. Hence, if there is insufficient power to activate third logic unit $220_3$, PD $120_1$ would still be able to receive and transmit signals within the first frequency range.

Figure 3:
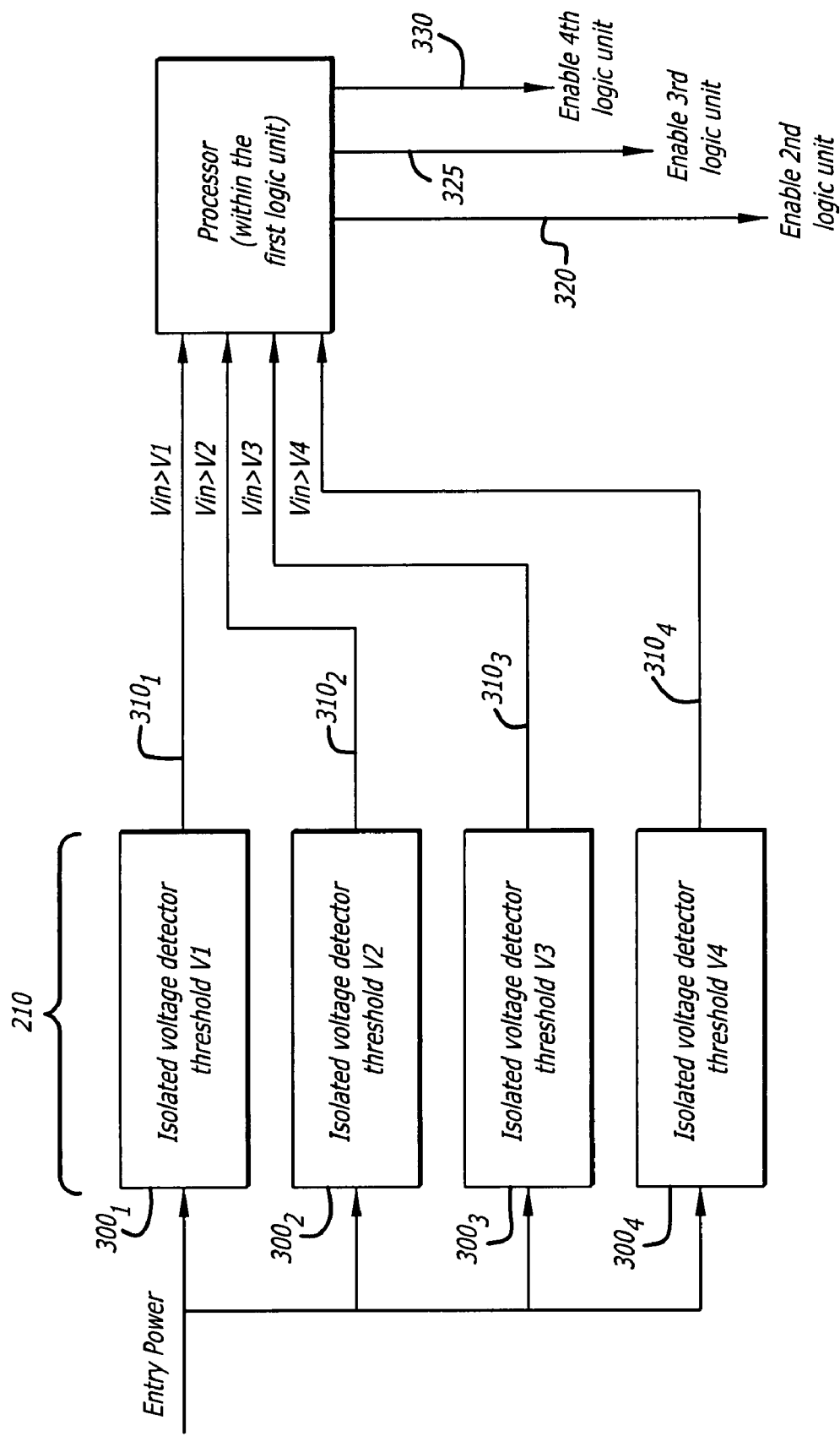
FIG. 3 is a first exemplary embodiment of voltage measuring circuit of FIG. 2.

Referring to FIG. 3, a first exemplary embodiment of voltage measuring circuit 210 of FIG. 2 is shown. Herein, voltage control circuit 210 includes a plurality of isolated voltage detectors $300_1$-$300_M$ corresponding to each logic unit $220_1$-$220_M$. These voltage detectors $300_1$-$300_M$ are assigned to detect whether the measured voltage falls below a threshold voltage assigned to that detector. The threshold voltages assigned to voltage detectors $300_1$-$300_M$ may vary by more than ten voltages to a fraction of a volt.

As an illustrative embodiment, the threshold voltages for voltage detectors $300_1$-$300_4$ are set to be V1 volts "v" (e.g., 40v), V2 (e.g., 42v), V3 (e.g., 44v) and V4 volts (e.g., 46v), respectively. If the measured supply voltage is 44 volts, only first, second and third logic units $220_1$-$220_3$ are activated. However, if the measured voltage is 48 volts, all of the logic units $220_1$-$220_4$ are activated. Such activation may be accomplished through transmission of multiple threshold signals $310_1$-$310_4$ to processor 250 and Enable signals 320, 325 and 330 to logic units $220_2$-$220_4$.

Figure 4:
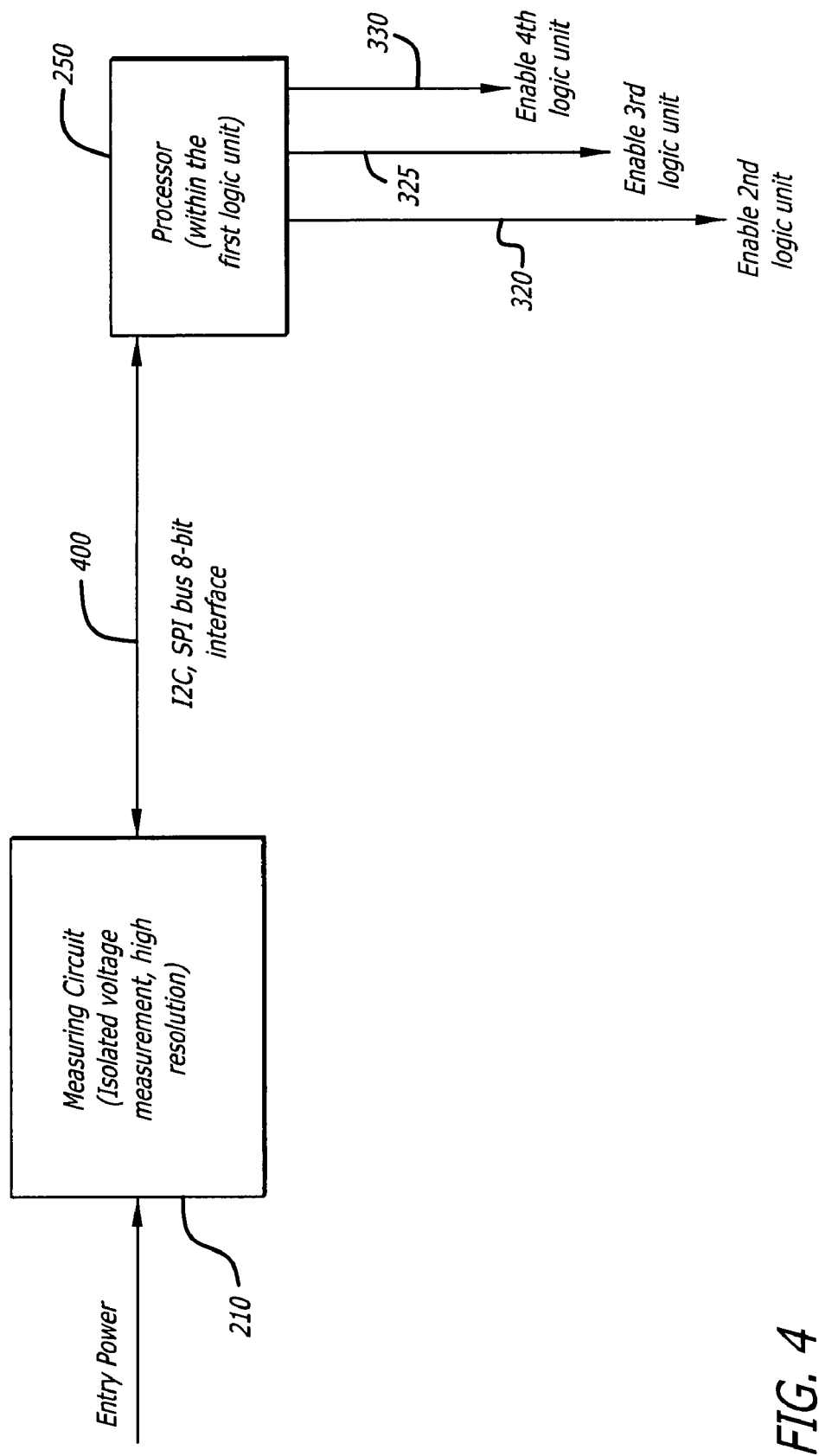
FIG. 4 is a second exemplary embodiment of voltage measuring circuit of FIG. 2.

Referring to FIG. 4, a second exemplary embodiment of voltage measuring circuit 210 of FIG. 2 is shown. Herein, voltage measuring circuit 210 is adapted to perform a real-time measurement of the input supply voltage. This measurement is conducted with a high resolution that can accurately read with resolution down to 0.2 volts. Voltage measuring circuit 210 is coupled to processor 250 over a bus 400. According to one embodiment of the invention, bus 400 may be implemented as a multi-master serial bus (e.g., I²C) or an eight-bit Serial Peripheral Interface (SPI) bus. Hence, the measured supply voltage may be represented by control data transmitted over bus 400 to processor 250 and temporarily stored in a storage element (e.g., register). Based on the measured supply voltage, control logic within processor 250 controls the activation of one or more of the logic units $220_2$-$220_M$ of FIG. 2 via Enables signals 320, 325 and 330, presuming that the control logic is implemented as part of first logic unit $220_1$.

Figure 5:
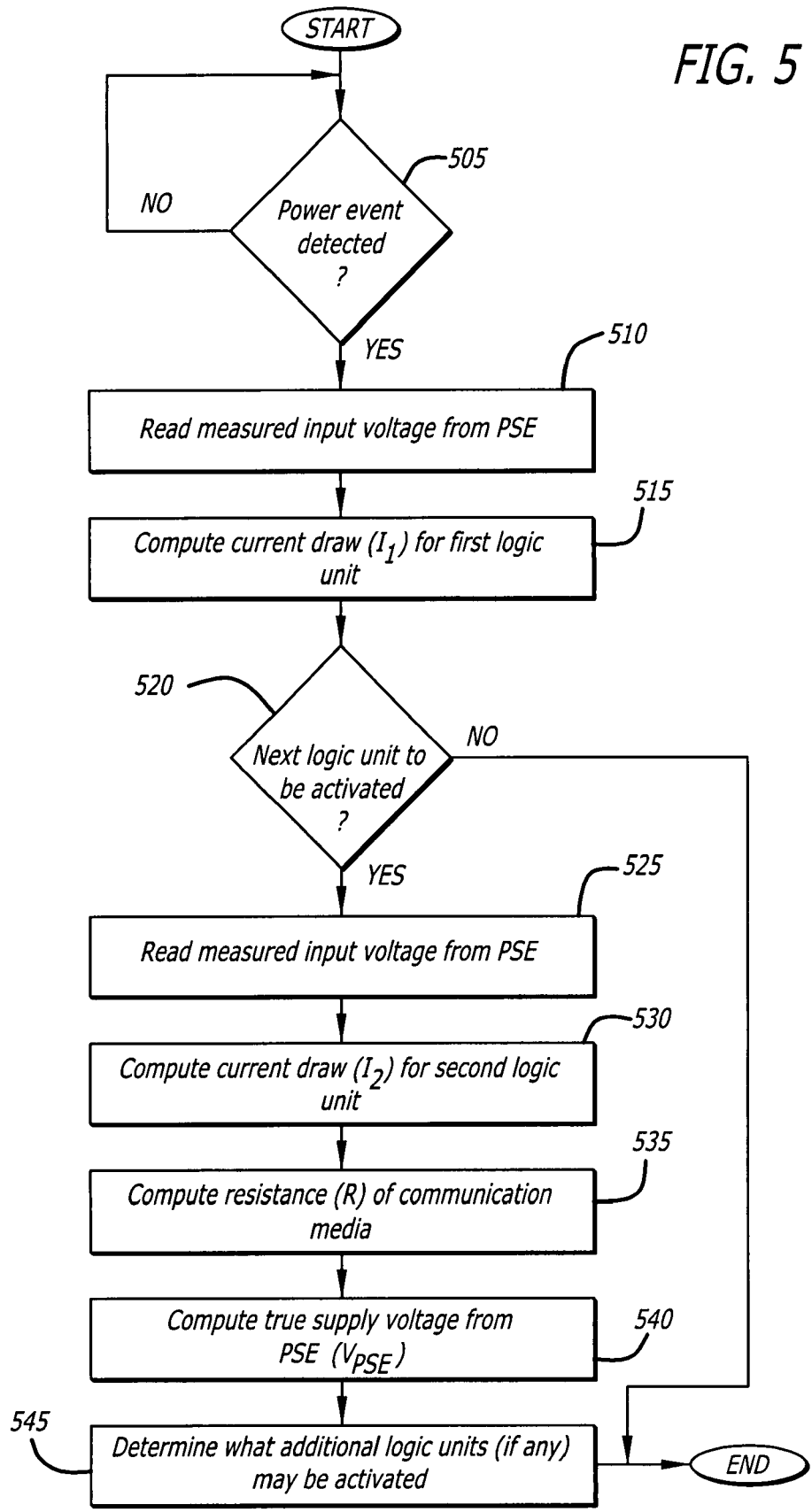
FIG. 5 is a first exemplary flowchart of the operations of the activation logic of FIG. 2 featuring the voltage measuring circuit and control logic.

Referring now to FIG. 5, an exemplary flowchart of the operations of activation logic 200 of FIG. 2 in activating one or more logic units $220_2$-$220_M$ is shown. Initially, upon detecting a power event, control logic implemented within the powered device (PD) reads the measured input voltage for the supply power received from the PSE (blocks 505 and 510). For illustrative purposes, the measured input voltage is identified as "$Vin_1$". Therefore, based on the known power (watts) currently being used, represented by the parameter "W1", the current draw ($I_1$) may be computed by the following determination (block 515):

$$I_1 = W1/Vin_1 \qquad (1)$$

Once these parameters ($Vin_1$, $I_1$, W1) are measured and computed, a determination may be made whether a first logic unit should be activated (block 520). This determination involves the computation of a maximum amount of power (W1+W2) that would be used by the PD if the first logic unit was activated.

$$W1+(Vin_1 * I_2(max)), \text{ where} \qquad (2)$$

"$I_2$(max)" is the maximum current required by the first logic unit.

Thereafter, if the measured power is less than the computed power needed, the first logic unit is activated and, at this time, the voltage associated with the supply power received from the PSE is measured again (block 525). For illustrative purposes, the measured voltage is identified as "$Vin_2$". As a result, based on the known power (W1+W2) currently used by the PD, the actual current draw by the first logic unit may be determined by the following computation (block 530):

$$I_2 = (W1+W2)/Vin_2 \qquad (4)$$

Now, a determination can be made to calculate the resistance of the communication media based on a presumption that the PSE supply voltage does not change (block 535). By detecting the resistance of the communication media, the PD can determine if the connection is optimal or not. The resistance (R) is computed as follows:

$$R = (Vin_1 - Vin_2)/(I_1 - I_2) \qquad (5)$$

Upon determination the resistance (R) of the communication media, the true PSE supply voltage ($V_{PSE}$) can be determined by adding $Vin_1$ and $I_1 * R$ (block 540). Upon knowing the PSE supply voltage, a determination can be made as to what other logic units, if any, can be activated since the requisite power for these logic units is known (block 545).

Figure 6:
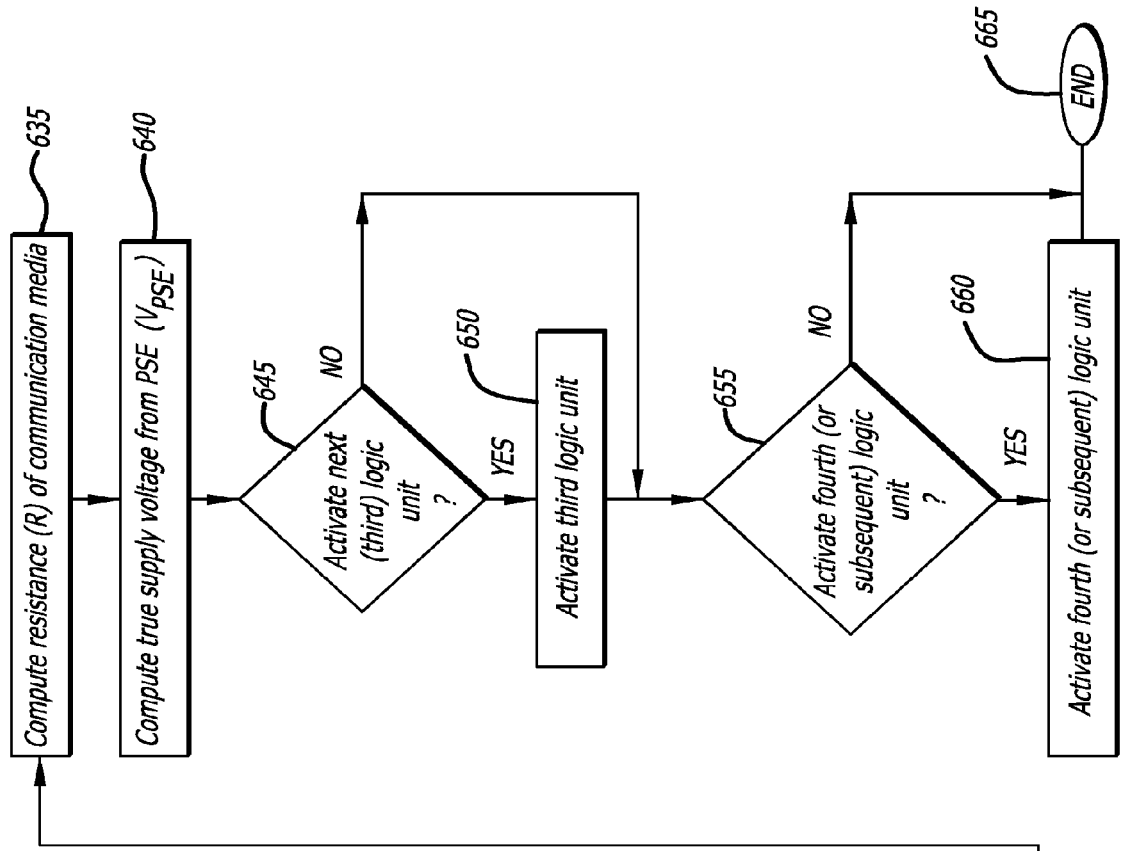
FIG. 6 is a second exemplary flowchart of the operations of the activation logic of FIG. 2 featuring the voltage measuring circuit and control logic.
Figure 6:
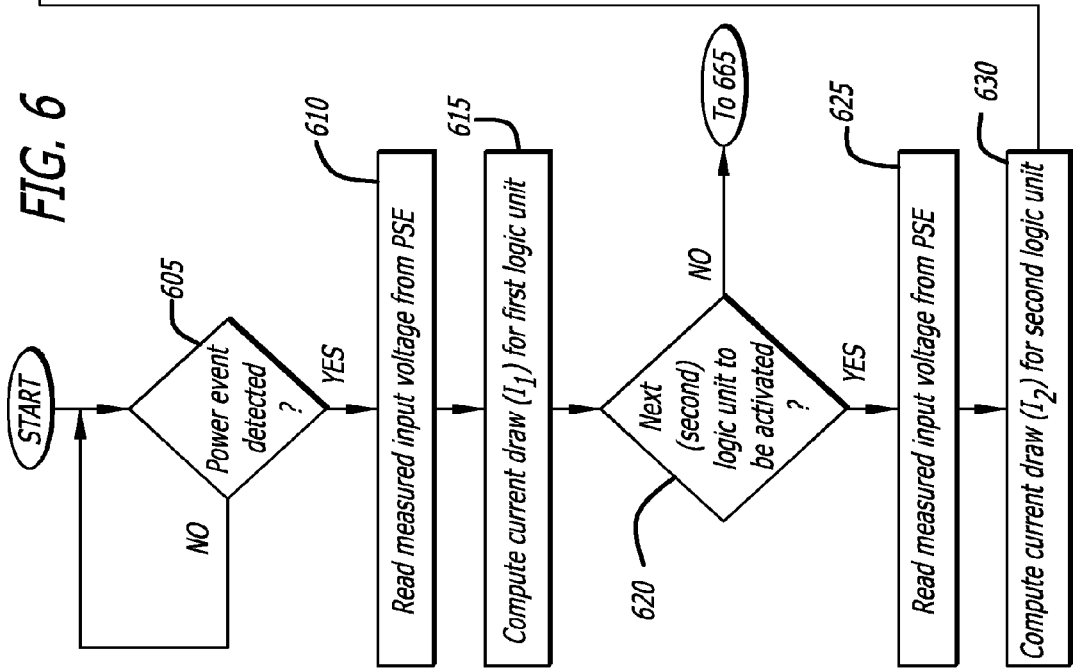

Referring now to FIG. 6, a second exemplary flowchart of the operations of activation logic 200 of FIG. 2 in activating one or more logic units $220_2$-$220_M$ is shown. Initially, at power down, first logic unit $220_1$ including processor control logic 240 remains in an active state while logic units $220_1$-$220_M$ are in an inactive state (block 600). Upon detecting a power event, the processor control logic 240 reads the measured input voltage received by the PD from the PSE (blocks 605 and 610). For illustrative purposes, the measured input voltage is identified as "$Vin_1$". Therefore, based on the known power (watts) used by the first logic unit, represented by the parameter "W1", the current draw by the first logic unit ($I_1$) may be computed by the following determination (block 615):

$$I_1 = W1/Vin_1 \qquad (1)$$

Once these parameters ($Vin_1$, $I_1$, w1) are measured and computer, a determination may be made whether a next logic unit (e.g., a second logic unit $220_2$ of FIG. 2) should be activated (block 620). This determination involves determination of the maximum amount of power used by both the first and second logic units $220_1$ and $220_2$ (W1+W2) based on the following computation:

$$W1+(Vin_1 * I_2(max)), \text{ where} \qquad (2)$$

"$I_2$(max)" is the maximum current required by second logic unit $220_2$.

Thereafter, second logic unit $220_2$ is activated and an input voltage received by the PD from the PSE at this time is measured again (block 625). For illustrative purposes, the measured voltage is identified as "$Vin_2$". As a result, based on the known power used by both the first and second logic units (W1+W2), the actual current draw by second logic unit $220_2$ may be determined by the following computation (block 630):

$$I_2 = (W1+W2)/Vin_2 \qquad (4)$$

At this point, a determination can be made to calculate the resistance of the communication media based on a presumption that the PSE supply voltage does not change (block 635). The resistance (R) is computed as follows:

$$R = (Vin_1 - Vin_2)/(I_1 - I_2) \qquad (5)$$

Upon determination the resistance (R) of the communication media, the true PSE supply voltage ($V_{PSE}$) can be determined by adding $Vin_1$ and $I_1 * R$ (block 640). Upon knowing the PSE supply voltage, the same scheme can be used to activate certain logic units depending the remaining power supply available.

For instance, a determination may be made whether a third logic unit should be activated (block 645). This determination involves the computation of a maximum amount of power (W1+W2+W3) that would be used by the PD if the second logic unit was activated.

$$W1+W2+(Vin_2 * I_3(max)), \text{ where} \qquad (6)$$

"$I_3$(max)" is the maximum current required by the second logic unit.

Thereafter, the third logic unit is activated if the computed power is less than the measured power for the PSE (block 650). Otherwise, if there are additional logic units to be activated, a subsequent determination may be made whether a fourth logic unit should be activated (block 655). This determination involves the computation of a maximum amount of power (W1+W2+W4) that would be used by the PD if the second logic unit was activated.

$$W1+W2+(Vin_2 * I_4(max)), \text{ where} \qquad (6)$$

"$I_4$(max)" is the maximum current required by the third logic unit.

Thereafter, the fourth logic unit is activated if the computed power is less than the measured power for the PSE (block 660). Otherwise, if there are no further logic units to activate, the activation scheme ends (block 665).

While the invention has been described in terms of several embodiments, the invention should not limited to only those embodiments described, but can be practiced with modification and alteration within the spirit and scope of the appended claims. For instance, the measuring circuit may be adapted to measure a second power parameter, namely current, in lieu of voltage (first power parameter) since both of these parameters are related to power. The description is thus to be regarded as illustrative instead of limiting.

What is claimed is:

1. A method comprising:
   measuring a level of supply voltage provided to a powered device by a remote source; and
   automatically altering functionality of the powered device by
      using the measured supply voltage to determine (i) a measured power supply and (ii) if the measured power supply is greater than an amount of power needed to power a first logic unit, the first logic unit being circuitry for controlling a first radio frequency (RF) circuit to receive and transmit signals over a first frequency,
      activating the first logic unit if the measured power supply is greater than the amount of power needed to power the first logic unit, wherein activating the first logic unit includes transmitting a first enable signal to the first logic unit,
      re-measuring the supply voltage for use in computing a resistance of an interconnect coupling the powered device and the remote source, the resistance being used for determining whether a second logic unit is to be powered, the second logic unit being circuitry for controlling a second radio frequency (RF) circuit to receive and transmit signals over a second frequency, and
      refraining from activating the second logic unit if the supply voltage is less than a voltage needed to power at least the first logic unit and the second logic unit.

2. The method of claim 1, wherein the remote source is power supply equipment.

3. The method of claim 2, wherein the power supply equipment is a network switch and the powered device is an access point.

4. The method of claim 1, wherein the measuring of the level of the supply voltage includes measuring a voltage level of the input voltage for power supplied by the remote source.

5. The method of claim 1, wherein prior to computing the resistance of the interconnect coupling the powered device and the remote source, the method further comprises computing an actual current draw by the first logic unit.

6. An apparatus comprising:
   an input port;
   a measuring circuit to measure a power parameter associated with power supplied over a communication media to the input port; and
   a processor including a plurality of logic units, each logic unit being activated in series if the power supplied over the input port exceeds an amount of power needed to power the activated logic units of the plurality of logic units, a first logic unit being circuitry to control a first radio frequency (RF) circuit to receive and transmit signals over a first frequency and a second logic unit being circuitry to control a second RF circuit to receive and transmit signals over a second frequency,
   wherein the measuring circuit is to compute a resistance of the communication media, the resistance being used for determining a true voltage supplied over the communication media and, based on the true voltage, whether one of the plurality of logic units is to be powered.

7. The apparatus of claim 6, wherein the apparatus is a powered device receiving the power from a power supply equipment in accordance with any standard supporting the delivery of power over the communication media.

8. The apparatus of claim 7 being an access point receiving the power from a network switch.

9. The apparatus of claim 6, wherein the measuring circuit comprises a plurality of voltage detectors, a first voltage detector being responsible for signaling whether the power parameter for the power supplied over the input port exceeds a first threshold voltage to cause activation of a first logic unit of the plurality of logic units and a second voltage detector being responsible for signaling whether the power parameter for the power supplied over the input port exceeds a second threshold voltage to cause activation of a second logic unit of the plurality of logic units, the power parameter being a measured voltage.

10. The apparatus of claim 6, wherein the measuring circuit performs real-time measurements of the power parameter to cause one or more of the logic units to be activated based on the real-time measurements of the power parameter.

11. The apparatus of claim 10, wherein the power parameter is a voltage measurement.

12. The apparatus of claim 6, wherein each of the logic units operates to support a different function supported by the processor.

13. The apparatus of claim 6 wherein the first frequency supported by the first RF circuit is different from the second frequency supported by the second RF circuit.

14. A system comprising:
   a communication media;
   a power supply equipment coupled to a first end of the communication media; and
   a powered device including a port coupled to a second end of the communication media, the powered device including
      a measuring circuit to measure a parameter associated with power supplied over the communication media from the power supply equipment and to compute a resistance of the communication media, and
      a processor including a plurality of logic units, a first logic unit of the plurality of logic units being circuitry to control a first radio frequency (RF) circuit to receive and transmit signals over a first frequency and a second logic unit of the plurality of logic units being circuitry to control a second radio frequency (RF) circuit to receive and transmit signals over a second frequency,
      wherein the resistance being used for determining a true voltage supplied over the communication media and each logic unit being activated sequentially if the power supplied based on the true voltage exceeds an amount of power needed to activate that logic unit and previously activated logic units, wherein each logic unit being activated is activated by receiving one of a plurality of enable signals.

15. The system of claim 14, wherein the power supply equipment is a network switch.

16. The system of claim 14, wherein the powered device is an access point.

17. The system of claim 14, wherein the parameter is a measured voltage.

18. The system of claim 17, wherein the measuring circuit of the powered device comprises a plurality of voltage detectors corresponding to each of the plurality of logic units, each voltage detector being responsible to signal if the measured voltage for the power supplied by the power supply equipment exceeds a threshold voltage in order to activate the corresponding logic unit.

19. The system of claim 14, wherein each of the logic units controls a different function performed by the powered device.

20. The system of claim 14 wherein the first frequency supported by the first RF circuit is different from the second frequency supported by the second RF circuit.

* * * * *